C. L. Drury,
Horse Power.
No. 95,008.  Patented Sep. 21, 1869.

Witnesses:  
Jno. H. Brooks  
Frank Lowell

Inventor:  
C. L. Drury  
per Munn & Co  
Attorneys.

United States Patent Office.

CHARLES L. DRURY, OF ROCKINGHAM, VERMONT.

Letters Patent No. 95,008, dated September 21, 1869.

IMPROVEMENT IN HORSE-POWER.

The Schedule referred to in these Letters Patent and making part of the same.

*To all whom it may concern:*

Be it known that I, CHARLES L. DRURY, of Rockingham, (Saxton River Village,) in the county of Windham, and State of Vermont, have invented a new and improved Horse-Power; and I do hereby declare that the following is a full, clear, and exact description thereof, by which those skilled in the art can make and use the same, reference being had to the accompanying drawings, forming part of this specification, in which—

Similar letters of reference indicate corresponding parts.

Figure 1:
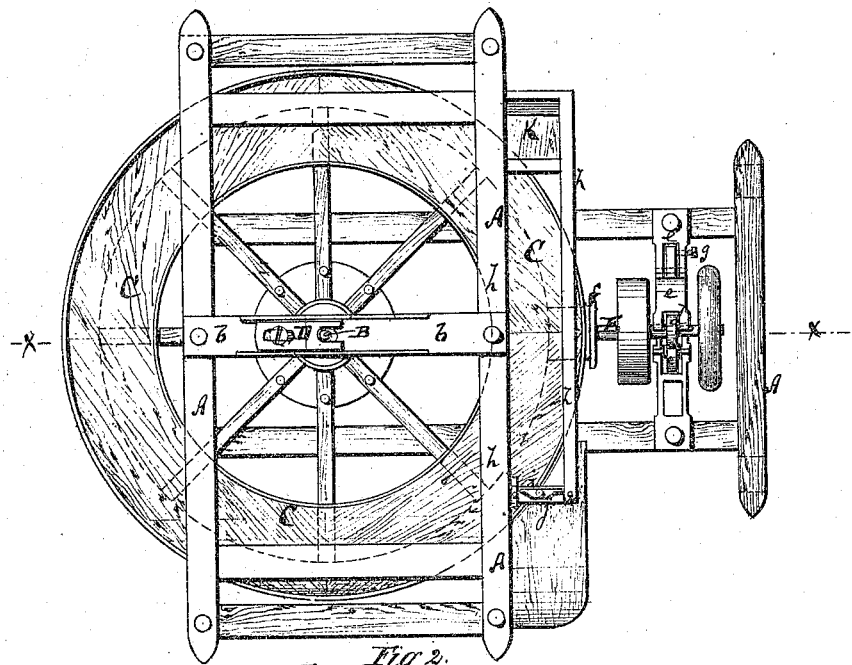
Figure 1 represents a plan or top view of my improved horse-power.
Figure 2:
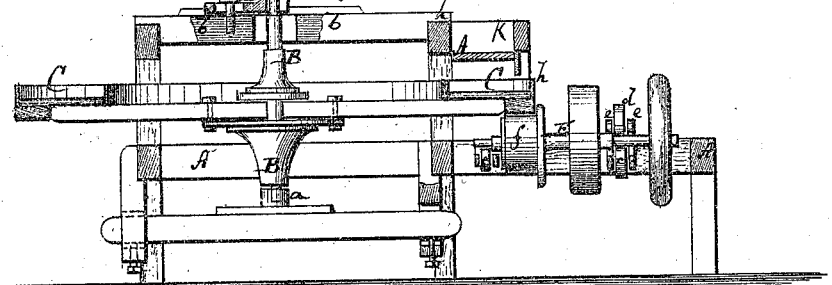
Figure 2 is a vertical longitudinal section of the same, taken on the plane of line $x\ x$ of fig. 1.

This invention relates to a new horse-power of that class in which the animal moves on an inclined wheel or disk; and The invention consists in the arrangement of devices for adjusting the position of said wheel, and in the application of adjustable anti-friction bearings for the transmitting-axle, as well as in the general arrangement and combination of parts.

A, in the drawing, represents the frame of my improved horse-power. It is made of wood or other suitable material, of suitable form, and strong enough, for the purpose of sustaining the machinery connected with the apparatus.

B is the shaft which carries the driving-wheel C.

Figure 3:
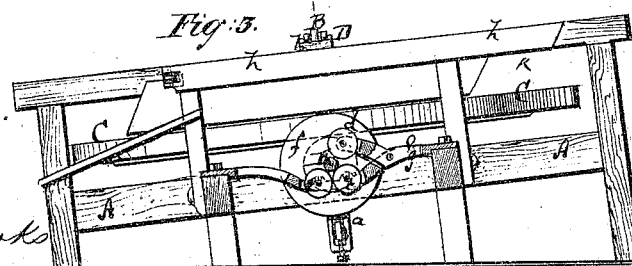
Figure 3 is a vertical transverse section of the same.

The shaft stands somewhat inclined, as in fig. 3, so as to hold the wheel in an inclined position, and the whole frame may, if desired, be put up in a similar inclined position, as in fig. 3.

The lower end of the shaft B is set in a step, $a$, while its upper end fits through a slotted cross-bar, $b$, of the frame, and is, by a sliding plate, D, adjusted nearer to or further away from the end of the transmitting-shaft E.

The shaft E is placed horizontally upon rollers $c\ c$, which are hung on the frame A, and is held down by rollers $d$, which are attached to pivoted bars, $e$, as in fig. 3, and which prevent the shaft E from being unsteady on its bearings.

A conical or other friction-wheel, $f$, mounted on the shaft E, is brought in contact with the under side or edge of the wheel C, and is revolved by the same.

The contiguous portions of the wheels C $f$ may, if desired, be toothed.

The degree of friction is regulated by the plate D, which holds the wheel C more or less close against $f$.

The pivoted bars $e$, when adjusted to the shaft E, are locked by set-screws $g$.

The animal for operating the machine travels on the wheel C, between bars $h\ h$ of the frame A. It is hitched to a whiffletree, $i$, which is hung to the gate $j$, through which the animal enters the machine.

A feed-box, $k$, is arranged between the bars $h\ h$, in front of the animal.

The space between the bars $h$ may be of suitable width to accommodate one or more animals.

The shaft E transmits motion to other machinery by means of belt or pulley or otherwise.

Having thus described my invention,

I claim as new, and desire to secure by Letters Patent—

1. The inclined shaft B, carrying the wheel C, in combination with the steps $a$ and sliding-guide D, substantially as herein shown and described.

2. The swinging bars, $e$, carrying the wheels $d$, and arranged, in combination with the shaft E and rollers $c$, substantially as and for the purpose herein shown and described.

3. The frame A, having the bars $h\ h$, the gate $j$, and the whiffletree $i$, or its equivalent, hung to it, in combination with the inclined shaft B, and wheel C, substantially as specified.

C. L. DRURY.

Witnesses:
G. H. HUBBARD,
F. C. BIXBY.